(12) United States Patent
Kayano et al.

(10) Patent No.: US 9,812,731 B2
(45) Date of Patent: Nov. 7, 2017

(54) BATTERY MODULE

(71) Applicant: Nissan Motor Co., Ltd., Yokohama-shi, Kanagawa (JP)

(72) Inventors: Shigeki Kayano, Kanagawa (JP); Yui Suzuki, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 15/113,102

(22) PCT Filed: Feb. 12, 2014

(86) PCT No.: PCT/JP2014/053202
§ 371 (c)(1),
(2) Date: Jul. 21, 2016

(87) PCT Pub. No.: WO2015/121926
PCT Pub. Date: Aug. 20, 2015

(65) Prior Publication Data
US 2017/0012315 A1 Jan. 12, 2017

(51) Int. Cl.
*H01M 10/052* (2010.01)
*H01M 10/04* (2006.01)
(Continued)

(52) U.S. Cl.
CPC ..... *H01M 10/0481* (2013.01); *H01M 2/1016* (2013.01); *H01M 2/1077* (2013.01); *H01M 2/34* (2013.01); *H01M 10/0413* (2013.01); *H01M 10/0436* (2013.01); *H01M 10/052* (2013.01); *H01M 10/0585* (2013.01); *H01M 2200/00* (2013.01); *H01M 2220/20* (2013.01); *Y02E 60/122* (2013.01)

(58) Field of Classification Search
CPC ... H01M 10/052; H01M 2/1077; H01M 2/206
See application file for complete search history.

(56) References Cited

U.S. PATENT DOCUMENTS

2008/0057392 A1   3/2008   Takamatsu et al.

FOREIGN PATENT DOCUMENTS

EP   2 833 433 A1   2/2015
JP   2008-59941 A   3/2008
(Continued)

*Primary Examiner* — Olatunji Godo
(74) *Attorney, Agent, or Firm* — Global IP Counselors, LLP

(57) ABSTRACT

A battery module has at least one individual cell and a housing. The individual cell has a power generating element with positive and negative electrodes stacked with a separator therebetween and sealed by a cladding material. The housing has a pair of cases that sandwiches the cell from opposite sides and a plate shaped reinforcing member joined to and reinforcing one of the cases. One of the cases has a bulging portion, a first extension portion, an inclined portion and a second extension portion. The bulging portion protrudes toward and presses the cell. The first extension portion extends transversely from the bulging portion with respect to the stacking direction. The inclined portion extends from the first extension portion while sloping toward the cell. The second extension portion extends transversely from the inclined portion with respect to the stacking direction. The second extension portion is joined to the reinforcing member.

20 Claims, 2 Drawing Sheets

(51) Int. Cl.
*H01M 2/10* (2006.01)
*H01M 2/34* (2006.01)
*H01M 10/0585* (2010.01)

(56) References Cited

FOREIGN PATENT DOCUMENTS

| | | |
|---|---|---|
| JP | 2013-101809 A | 5/2013 |
| WO | 2013/069356 A1 | 5/2013 |
| WO | 2014/013198 A1 | 1/2014 |

BATTERY MODULE

CROSS-REFERENCE TO RELATED APPLICATIONS

This application is a U.S. National stage application of International Application No. PCT/JP2014/053202, filed Feb. 12, 2014.

BACKGROUND

Field of the Invention

The present invention relates to a battery module.

Background Information

Conventionally, an individual cell is constructed by sealing a power generating element by a cladding material. A battery module is constructed by stacking several individual cells and housing the same in a housing. With individual cells, there are cases in which gas is generated in the power generating element accompanying charge/discharge. The performance of an individual cell is reduced when gas is collected in the power generating element. Therefore, a configuration has been disclosed in which the power generating element portion of an individual cell is pressed from the outside by a case of the housing to push out the gas from the power generating element portion of the individual cell to the peripheral portion (refer to Japanese Laid Open Patent Application No. 2008-59941).

SUMMARY

Meanwhile, if the power generating element portion of the individual cell can be more powerfully pressed, gas can be more effectively pushed out from the power generating element portion to the peripheral portion. However, if the stiffness of the case is simply increased, flexibly pressing the power generating element portion of the individual cell in accordance with the pressure of the gas becomes difficult, and there is the possibility that the generated gas cannot be sufficiently removed from the power generating element portion to the peripheral portion. Therefore, a technique capable of improving the stiffness of the case, in a state in which the pressing force with respect to the individual cell is sufficiently maintained, is in demand.

In order to solve the problem described above, an objective of the present invention is to provide a battery module that is capable of pressing individual batteries sufficiently while improving the stiffness of the case.

A battery module according to the present invention, which achieves the objective above, comprises a least one individual cell and a housing. The individual cell comprises a power generating element and a cladding material. The power generating element is formed by stacking a positive electrode and a negative electrode via a separator. The cladding material seals the power generating element. The housing is provided with a pair of cases and a reinforcing member. The cases sandwich the individual cell from two sides in the stacking direction. The reinforcing member is formed so as to have a plate shape, and is joined to at least one pair of cases. Here, at least one of the pair of cases is provided with a bulging portion, a first extension portion, an inclined portion, and a second extension portion. The bulging portion is formed so as to be curved and to protrude toward the individual cell, and presses the individual cell. The first extension portion is formed so as to extend from the outer periphery of the bulging portion in a direction that intersects with the stacking direction. The inclined portion is formed so as to extend from the outer periphery of the first extension portion while bending or curving toward the individual cell. The second extension portion extends from the outer periphery of the inclined portion along a direction that intersects with the stacking direction and is joined to the reinforcing member.

DETAILED DESCRIPTION OF THE EMBODIMENTS

Figure 1:
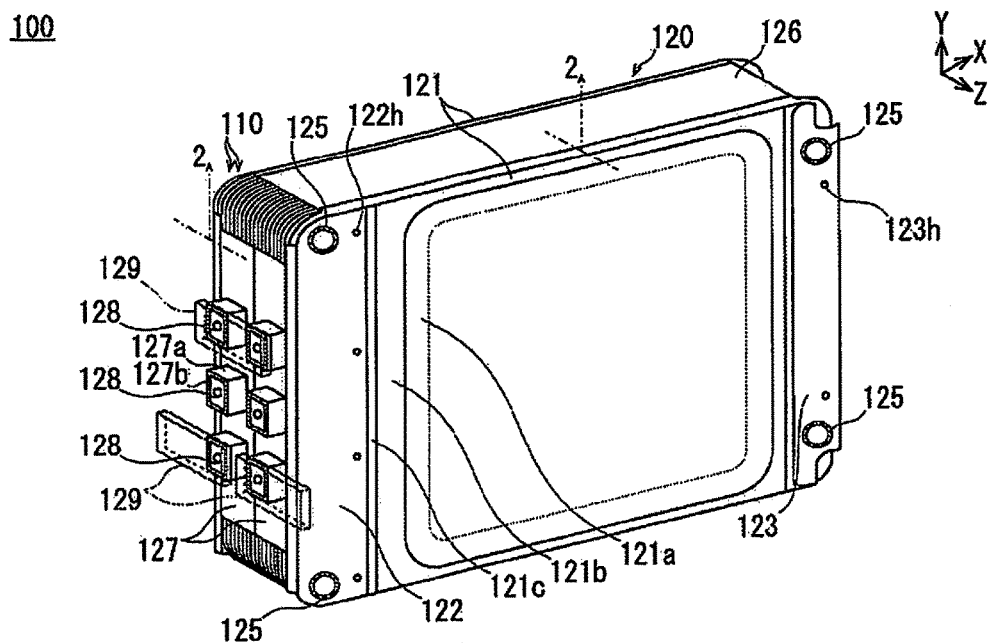
FIG. 1 is a perspective view illustrating a battery module in accordance with a first embodiment.

Embodiments according to the present invention will be described below, with reference to the appended drawings. In the explanations of the drawings, the same elements are given the same reference characters, and overlapping explanations are omitted. The sizes and ratios of the members in the drawing are exaggerated for convenience of explanation, and can be different from the actual sizes and ratios. In all of the drawings from FIG. 1 to FIG. 4, the orientation is shown using arrows represented by X, Y, and Z. The direction of the arrow indicated by Z is the stacking direction of the individual cell 110. The direction of the arrow indicated by X is a direction that intersects with the stacking direction Z of the individual cell 110. The X direction corresponds to the longitudinal direction of the individual cell 110. The direction of the arrow indicated by Y is a direction that intersects with the stacking direction Z of the individual cell 110 as well as the X direction. The Y direction corresponds to the lateral direction of the individual cell 110.

First Embodiment

The battery module 100 is configured to house a plurality of the individual cells 110 in the housing 120. The battery module 100 is disposed on, for example, an automobile, and supplies power to an engine that is provided to the automobile.

The configuration of the battery module 100 will be described with reference to FIGS. 1 to 3.

FIG. 1 is a perspective view illustrating the battery module 100. FIG. 2 is an end surface view illustrating the battery module 100 of FIG. 1. FIG. 2 is shown relative to the 2-2 line in FIG. 1. FIG. 3 is an end surface view illustrating the principle parts of the individual cell 110 which is disposed to the battery module 100 of FIG. 2. FIG. 3 illustrates the region K in FIG. 2.

The battery module 100 comprises a plurality of individual cells 110 and a housing 120. The configuration of the battery module 100 will be described below.

The individual cells 110 are provided with a power generating element 10 and a cladding material (laminated sheet 20). The power generating element 10 is formed by stacking a positive electrode 11 and a negative electrode 12 via a separator 13. An insulating member 14 prevents the positive electrode 11 and the negative electrode 12 from becoming electrically short-circuited, even if the end of the positive electrode 11 and the end of the negative electrode 12 face each other due to the component members of the power generating element 10 becoming misaligned. The laminated sheet 20 seals the power generating element 10. The positive electrode 11, the negative electrode 12, the separator 13, the insulating member 14, and the laminated sheet 20 which configure the individual cells 110 will be described below in order.

The positive electrode 11 corresponds to an electrode on the anode side. The positive electrode 11 is configured by binding a positive electrode active material 11b to each of the two sides of a conductive positive electrode current collector 11a, which is formed so as to have a plate shape, as illustrated in FIG. 3. A positive electrode terminal that draws power is formed extending from a portion of one end of the positive electrode current collector 11a in the longitudinal direction (X direction). The positive electrode terminals of the plurality of the stacked positive electrodes 11 are fixed to each other by welding or adhesion.

Examples of materials used for the positive electrode current collector 11a include aluminum expanded metal, aluminum mesh, and aluminum punched metal. Examples of materials used for the positive electrode active material 11b include various oxides (lithium manganese oxides such as $LiMn_2O_4$; manganese dioxide; lithium nickel oxides such as $LiNiO_2$; lithium cobalt oxides such as $LiCoO_2$; lithium-containing nickel cobalt oxides; or amorphous vanadium pentoxide containing lithium) and chalcogen compounds (titanium disulfide or molybdenum disulphide).

The negative electrode 12 corresponds to an electrode on the cathode side. The negative electrode 12 is configured by binding a negative electrode active material 12b to each of the two sides of a conductive negative electrode current collector 12a, which is formed so as to have a plate shape, as illustrated in FIG. 3. A negative electrode terminal is formed extending from a portion of one end of the negative electrode current collector 12a so as to not overlap with the positive electrode terminal formed on the positive electrode 11 in the longitudinal direction (X direction). The longitudinal (X direction) length of the negative electrode 12 is longer than the longitudinal (X direction) length of the positive electrode 11. The lateral (Y direction) length of the negative electrode 12 is the same as the lateral (Y direction) length of the positive electrode 11. The negative electrode terminals of the plurality of the stacked negative electrodes 12 are fixed to each other by welding or adhesion.

Examples of materials used for the negative electrode current collector 12a include aluminum expanded metal, aluminum mesh, and aluminum punched metal. A carbon material that absorbs and releases lithium ions is used as a material for the negative electrode active material 12b. Examples of such carbon material used include natural graphite, artificial graphite, carbon black, activated carbon, carbon fiber, coke, or carbon synthesized by thermal treating an organic precursor (phenol resins, polyacrylonitrile, or cellulose) in an inert atmosphere.

The separator 13 electrically isolates the positive electrode 11 and the negative electrode 12. The separator 13 is formed so as to have a rectangular shape, and disposed between the positive electrode 11 and the negative electrode 12, as illustrated in FIG. 3. The longitudinal (X direction) length of the separator 13 is longer than the longitudinal (X direction) length of the positive electrode 11, excluding the positive electrode terminal portion. The separator 13 holds an electrolytic solution between the positive electrode 11 and the negative electrode 12 to ensure the conductance of ions.

For example, polypropylene is used as a material for the separator 13. The polypropylene impregnated with a non-aqueous electrolyte solution prepared by dissolving electrolytes in a nonaqueous solvent. Polymers are contained in order to retain the nonaqueous electrolyte solution.

The insulating member 14 prevents the positive electrode 11 and the negative electrode 12 from becoming electrically short-circuited, in the case that the end of the positive electrode 11 and the end of the negative electrode 12 face each other due to, for example, the separator 13 and the positive electrode 11, etc., becoming misaligned. The insulating member 14 is formed so as to have a thin plate shape having an insulating property, and is layered and joined to each of the two ends of the positive electrode 11 in the stacking direction Z, as illustrated in FIG. 3. The insulating member 14 can be layered and joined to the ends of the negative electrode 12 as well.

Figure 3:
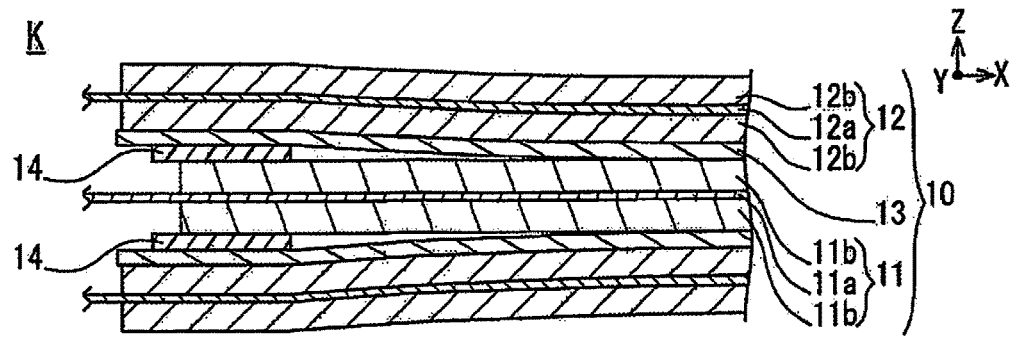
FIG. 3 is an end surface view illustrating the principle parts of the individual cells disposed in the battery module of FIG. 2, showing the region K in FIG. 2.

The laminated sheet 20 covers and seals the power generating element 10 from both sides along the stacking direction Z, as illustrated in FIG. 3. The laminated sheet 20 is configured from a rectangular sheet in which a metal plate is embedded. When sealing the power generating element 10 with the laminated sheet 20, sealing is carried out by opening a portion of the periphery of the laminated sheet 20 and sealing the rest of the periphery by thermal welding. Then, an electrolytic solution is injected from the opened portion of the laminated sheet 20 to impregnate the separator 13, etc., with the electrolytic solution. Finally, while removing air from the opened portion by depressurizing the inside of the laminated sheet 20, the opened portion is heat-sealed to achieve a complete seal.

For example, three types of mutually layered materials are used as the material for the laminated sheet 20. Specifically, examples of materials used for the thermal adhesive resin of the first layer, which is adjacent to the negative electrode 12, include polyethylene (PE), ionomer, or ethylene vinyl acetate (EVA). For example, Al foil or Ni foil is used as the metal foil of the second layer. For example, rigid polyethylene terephthalate (PET) or nylon is used for the resin film of the third layer.

The housing 120 integrally houses a plurality of the individual cells 110. The pair of cases 121 sandwich a plurality of the individual cells 110 from two sides in the stacking direction Z, as illustrated in FIG. 1 and FIG. 2. The reinforcing members 122 and 123 are joined to and reinforce the pair of cases 121. In addition to the case 121 and the reinforcing members 122 and 123, which configure the housing 120, a sleeve 124, an eyelet 125, a first side plate 126, a second side plate 127, a conductive member 128, and a bus bar 129 will be described in order below.

Figure 2:
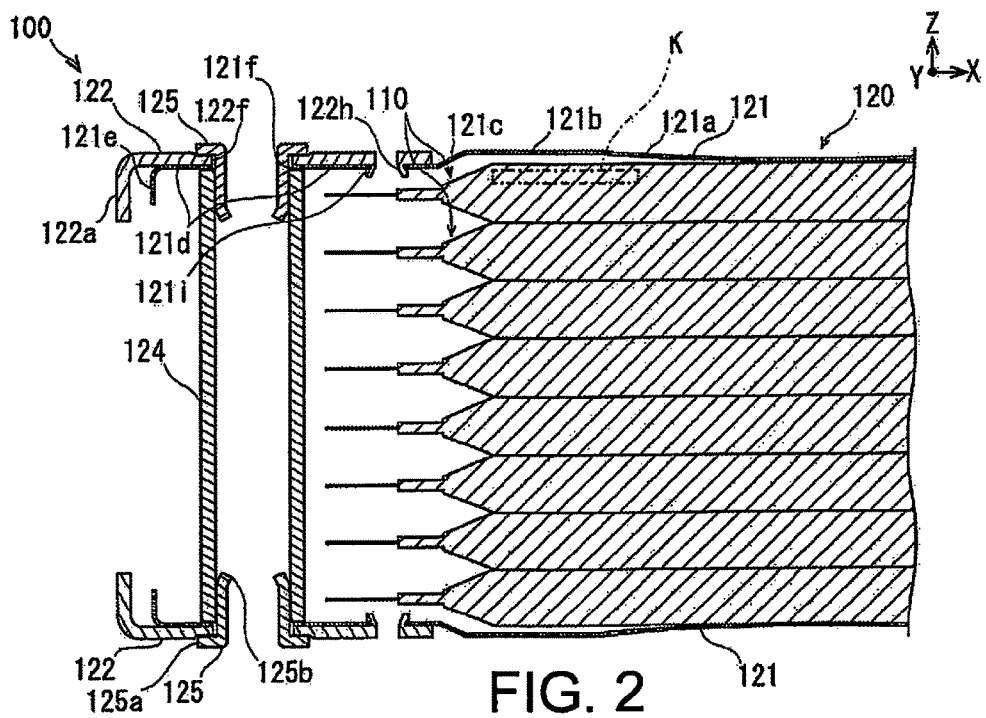
FIG. 2 is an end surface view illustrating the battery module of FIG. 1, shown relative to the section line 2-2 in FIG. 1.

The cases 121 are formed as a pair, and sandwich the individual cells 110 from two sides in the stacking direction Z, as illustrated in FIG. 2. The cases 121 are formed in a thin plate shape, and comprise a bulging portion 121a in the center. A first extension portion 121b, an inclined portion 121c, and a second extension portion 121d are each integrally formed in the case 121 in that order, from the bulging portion 121a toward the two ends along the X direction. Similarly, a first extension portion 121b, an inclined portion 121c, and a second extension portion 121d are each integrally formed in the case 121 in that order, from the bulging portion 121*a* toward the two ends along the Y direction. The second extension portion 121*d* at the two ends of the case 121 along the Y direction is shorter than the second extension portion 121*d* at the two ends of the case 121 along the X direction. It is sufficient for at least a first extension portion 121*b* to be integrally formed in the case 121 from the bulging portion 121*a* toward each of the two ends along the Y direction.

The bulging portion 121*a* of the case 121 is formed so as to be curved and to protrude toward the individual cells 110, and presses the individual cells 110. The first extension portion 121*b* is formed so as to extend from the outer periphery of the bulging portion 121*a* along the X direction, which intersects with the stacking direction Z. The inclined portion 121*c* is formed so as to extend from the outer periphery of the first extension portion 121*b* while bending or curving toward the individual cells 110. The second extension portion 121*d* extends from the outer periphery of the inclined portion 121*c* along the X direction, which intersects with the stacking direction Z, and is joined to the reinforcing member 122 or 123.

The inclined portion 121*c* of the case 121 deformably supports the bulging portion 121*a* via the first extension portion 121*b*, in a state of being supported by the reinforcing member 122 or 123 connected to the second extension portion 121*d*. That is, the bulging portion 121*a* comprises an elastic force by means of the bulging portion 121*a*, the first extension portion 121*b*, the inclined portion 121*c*, and the second extension portion 121*d*, and flexibly presses the power generating element 10 portion of the individual cell 110 in accordance with the pressure of the gas.

The second extension portion 121*d* of the case 121 is formed by bending the end portion 121*e* that extends along the X direction and the Y direction, which intersect with the stacking direction Z, into an L-shape along the stacking direction Z, as illustrated in FIG. 2. The second extension portion 121*d* is provided with a through-hole 121*f* at each of the two ends in the Y direction, which penetrates along the stacking direction Z, as illustrated in FIG. 1 and FIG. 2. The through-hole 121*f* of the case 121 communicates with, for example, the through-hole 122*f* of the reinforcing member 122, and an eyelet 125 for fixing the sleeve 124 is inserted therein. In addition, the second extension portion 121*d* is provided with a plurality of fitting holes 121*i*, which penetrate through along the stacking direction Z, at predetermined intervals in the Y direction. For example, a projection 122*h* of the reinforcing member 122 is inserted in the fitting hole 121*i*.

The reinforcing members 122 and 123 reinforce the case 121, as illustrated in FIG. 1. The reinforcing members 122 and 123 are formed so as to have a plate shape, and are joined to the second extension portion 121*d* at both ends of the case 121, respectively, along the X direction. The reinforcing members 122 and 123 have a higher stiffness compared to the case 121. The reinforcing member 122 is formed so as to have a longer width in the X direction than the reinforcing member 123. The reinforcing member 122 is disposed on the side of a conductive member 128, which is connected to the individual cell 110. The reinforcing members 122 and 123 are joined to the second extension portion 121*d* at both ends of the case 121 along the X direction. However, for example, only the reinforcing member 122 can be joined to a second extension portion 121*d* at one end of the case 121 along the X direction as well.

At least a portion of the reinforcing members 122 and 123 is joined to the second extension portion 121*d* in a state of being adjacent thereto, along the stacking direction Z. That is, the reinforcing members 122 and 123 are superposed with the second extension portion 121*d* along the stacking direction Z. The thickness of the reinforcing members 122 and 123 along the stacking direction Z is thinner than the thickness in the stacking direction Z of the inclined portion 121*c*. That is, the reinforcing members 122 and 123 do not protrude in the stacking direction Z with respect to the first extension portion 121*b* of the case 121.

The reinforcing members 122 and 123 are provided with a flange portion at an end portion that extends along a direction that intersects with the stacking direction Z so as to separate from the second extension portion 121*d*. For example, the flange 122*a* of the reinforcing member 122 is formed by bending the end of the reinforcing member 122, which is along the X direction, along the stacking direction Z, as illustrated in FIG. 2. Due to being bent in an L-shape, the flange 122*a* can easily suppress deformation and maintain the shape when stress is applied from the outside. The flange 122*a* regulates the individual cell 110 from moving in the X direction or the Y direction by anchoring the individual cell 110.

The reinforcing members 122 and 123 are each provided with a through-hole which penetrates along the stacking direction Z at both ends along the Y direction. For example, the through-hole 122*f* of the reinforcing member 122 communicates with the through-hole 121*f* of the case 121, and an eyelet 125 for fixing the sleeve 124 is inserted therein, as illustrated in FIG. 2. In addition, for example, the reinforcing member 122 is provided with a plurality of projections 122*h*, which protrude along the stacking direction Z, at predetermined intervals in the Y direction. The projection 122*h* is fitted in the fitting holes 121*i* of the case 121.

The sleeve 124 corresponds to a holding member. The sleeve 124 is inserted between the pair of cases 121 to hold the distance between the pair of cases 121 constant, as illustrated in FIG. 2. The sleeve 124 is, for example, made of a hard metal and formed so as to have a long cylindrical shape. The sleeve 124 is disposed so as to communicate with through-holes 121*f* which are provided to the four corners of the case 121. By being disposed to the four corners of the pair of cases 121, the sleeve 124 protects a plurality of the individual cells 110 that are stacked between the pair of cases 121 from strain caused by external forces.

The eyelet 125 corresponds to a fixing member. For example, the eyelet 125 is inserted in the through-hole 122*f* of the reinforcing member 122 and the through-hole 121*f* of the case 121, and is press-fitted in the sleeve 124, after which the eyelet deforms itself and is compression bonded to the sleeve 124, as illustrated in FIG. 2. Specifically, the eyelet 125 is, for example, made of a soft metal and formed so as to have a short cylindrical shape. The eyelet 125 is formed so as to have a cylindrical shape in which one end 125*a* of the opening projects in a direction that intersects with the stacking direction Z, and which extends in the stacking direction Z. The other end 125*b* of the opening of the eyelet 125 is, for example, inserted in the through-hole 122*f* of the reinforcing member 122 and the through-hole 121*f* of the case 121, while the one end 125*a* of the opening is anchored to the reinforcing member 122. In each of the sleeves 124 provided to the four corners of the case 121, one eyelet 125 is inserted in each of the two ends that face each other along the stacking direction Z and fixed. In this manner, the eyelet 125 fixes the reinforcing member 122 and the second extension portion 121*d* at one end of the case 121 along the X direction, as well as fixing the reinforcing member 123 and the second extension portion 121d at the other end of the case 121 along the X direction.

The first side plates 126 are formed as a pair, and protect the sides of the plurality of the stacked individual cells 110 along the stacking direction Z as well as the X direction. The first side plate 126 is a thin plate and is formed so as to have a relatively long rectangular shape along the X direction, as illustrated in FIG. 1. The first side plate 126 is sandwiched between the end 121e of the pair of cases 121 disposed facing each other along the stacking direction Z and the sides of the plurality of the stacked individual cells 110 and fixed. The first side plate 126 can be integrally formed with one case among the pair of cases 121 that face each other along the stacking direction Z.

The second side plate 127 protects the sides of the individual cells 110 along the stacking direction Z and the Y direction, for each of a predetermined number of individual cells 110, as illustrated in FIG. 1. In addition, the second side plate 127 anchors the conductive member 128 to the side of the protrusion 127a along the Y direction, in the order of the positive electrode terminal, the cell voltage detection terminal, and the negative electrode terminal. The second side plate 127 is a thin plate and is formed so as to have a relatively long rectangular shape along the Y direction. The second side plate 127 houses and holds the conductive member 128 to the protrusion 127a which protrudes outward along the X direction. The protrusion 127a is provided with an opening 127b in the center thereof. The opening 127b of the protrusion 127a causes the conductive member 128 to face outward with respect to the X direction. Similar to the first side plate 126, the second side plate 127 is sandwiched between the end 121e of the pair of cases 121 disposed facing each other along the stacking direction Z and the sides of the plurality of the stacked individual cells 110 and fixed.

For each of a predetermined number of positive electrodes 11 and negative electrodes 12, which are stacked along the stacking direction Z, the conductive member 128 electrically connects the positive electrode terminals to each other, the negative electrode terminals to each other, and the cell voltage detection terminals to each other, independently, as illustrated in FIG. 2. The conductive member 128 comprises conductivity, and is formed so as to have a rectangular body shape. The conductive member 128 is housed in the protrusion 127a of the second side plate 127, and faces the outside from the opening 127b of the protrusion 127a.

The bus bar 129 electrically couples conductive members 128, which are connected to each of individual cells 110 that are adjacent along the stacking direction Z, to each other, as illustrated in FIG. 1. In FIG. 1, the bus bar 129 is illustrated as being translucent to show the conductive member 128 and the second side plate 127 in the portion located on the back of the bus bar 129. The bus bar 129 connects adjacent individual cells 110 in series or in parallel by selecting the connection method. The bus bar 129 is made of, for example, a copper alloy, and is formed so as to have a plate shape. The bus bar 129 is joined to adjacent conductive members 128 by bolting or laser welding.

According to the battery module 100 of the first embodiment described above, the action and effects are achieved by the following configurations.

The battery module 100 comprises a plurality of individual cells 110 and a housing 120. The individual cells 110 are provided with a power generating element 10 and a cladding material (laminated sheet 20). The power generating element 10 is formed by stacking a positive electrode 11 and a negative electrode 12 via a separator 13. The cladding material (laminated sheet 20) seals the power generating element 10. The housing 120 is provided with a pair of cases 121 and at least one reinforcing member 122 (which can be only the reinforcing member 122, or can be the reinforcing members 122 and 123). The pair of cases 121 sandwich the individual cells 110 from two sides in the stacking direction Z. The reinforcing member 122 is formed so as to have a plate shape, and is joined to at least one case 121 of the pair and reinforces the case 121. Here, at least one case 121 of the pair is provided with a bulging portion 121a, a first extension portion 121b, an inclined portion 121c, and a second extension portion 121d. The bulging portion 121a is formed so as to be curved and to protrude toward the individual cells 110, and presses the individual cells 110. The first extension portion 121b is formed so as to extend from the outer periphery of the bulging portion 121a along a direction that intersects with the stacking direction Z. The inclined portion 121c is formed so as to extend from the outer periphery of the first extension portion 121b while bending or curving toward the individual cells 110. The second extension portion 121d extends from the outer periphery of the inclined portion 121c along a direction that intersects with the stacking direction Z, and is joined to the reinforcing member 122 or 123.

According to such a configuration, it is possible to deformably support the bulging portion 121a that is adjacent to the first extension portion 121b by the inclined portion 121c provided between the first extension portion 121b and the second extension portion 121d, while reinforcing the case 121 by at least the reinforcing member 122 joined to the second extension portion 121d. Therefore, the battery module 100 is capable of pressing the individual cells 110 sufficiently with the case 121 while sufficiently improving the stiffness of the case 121.

Furthermore, the thickness of the reinforcing members 122 and 123 along the stacking direction Z can be configured to be thinner than the thickness in the stacking direction Z of the inclined portion 121c.

According to such a configuration, the reinforcing members 122 and 123 can be prevented from protruding in the stacking direction Z with respect to the first extension portion 121b of the case 121. Therefore, the battery module 100 is capable of improving the stiffness of the case 121 by the reinforcing members 122 and 123, without increasing the length along the stacking direction Z.

Furthermore, the reinforcing members 122 and 123 can be configured so that at least portions thereof are adjacent to the second extension portion 121d along the stacking direction Z.

According to such a configuration, since the reinforcing members 122 and 123 are superposed with the second extension portion 121d along the stacking direction Z, the stiffness of the case 121 can be further improved by the superposed portions.

Furthermore, the second extension portion 121d can be configured to be provided with one through-hole 121f which penetrates along the stacking direction Z, and, for example, the reinforcing member 122 can be configured to be provided with another through-hole 122f which penetrates along the stacking direction Z. Here, a holding member (sleeve 124) and a fixing member (eyelet 125) are further provided. The sleeve 124 is formed so as to have a cylindrical shape, and held by being inserted between the pair of cases 121 or the pair of reinforcing members 122. The eyelet 125 is formed so as to have a cylindrical shape in which one end 125a of the opening is projected in a direction that intersects with the stacking direction Z, and which extends in the stacking direction Z. The other end 125b of the opening of the eyelet 125 is inserted in one through-hole 121f and the other through-hole 122f and anchored to the sleeve 124, to fix the pair of cases 121 and, for example, the reinforcing member 122.

According to such a configuration, since, for example, the reinforcing member 122 and the second extension portion 121d of the case 121 are firmly fixed by the eyelet 125, the stiffness of the case 121 can be further improved.

Furthermore, for example, the reinforcing member 122 can be configured to be provided with a flange 122a, which is formed by being bent or curved along the stacking direction Z, at an end portion that extends along a direction that intersects with the stacking direction Z so as to separate from the second extension portion 121d.

According to such a configuration, since, for example, the end of the reinforcing member 122 is configured so as to be easily capable of suppressing deformation and maintaining the shape, the stiffness of the case 121 can be further improved. Furthermore, since the individual cells 110 are regulated from moving in the X direction and the Y direction, which intersect with the stacking direction Z by the flange 122a, the individual cells 110 can be prevented from being misaligned accompanying vibration or the like.

Furthermore, for example, the reinforcing member 122 can be configured to be provided with a projection 122h in a direction toward the individual cells 110 along the stacking direction Z, and the second extension portion 121d can be configured to be provided with a fitting pit or a fitting hole 121i for fitting the projection 122h along the stacking direction Z. The fitting hole 121i is formed by extending the second extension portion 121d there through. A fitting pit corresponds to one that is formed by providing a recess of a predetermined depth to the second extension portion 121d.

According to such a configuration, for example, the case 121 which presses the individual cells 110 can be prevented from moving in the X direction and the Y direction, which intersect with the stacking direction Z, with respect to the reinforcing member 122, by fitting the projection 122h of the reinforcing member 122 and the fitting hole 121i of the case 121 to each other.

Furthermore, the individual cells 110 can be configured to be provided with an insulating member 14, which is layered at the end of the positive electrode 11 or the negative electrode 12 to prevent electrical short-circuiting with an adjacent negative electrode 12 or positive electrode 11, and the inclined portion 121c can be configured so that the thickness in the stacking direction Z of the inclined portion 121c is larger than the thickness of the insulating member 14.

According to such a configuration, interference between the portion of the individual cell 110 that is swollen along the stacking direction Z due to the insulating member 14 and the first extension portion 121b portion of the case 121 can be avoided by the thickness in the stacking direction Z of the inclined portion 121c. Therefore, the battery module 100 is capable of preventing an increase in the length along the stacking direction Z, even when provided with an insulating member 14.

Furthermore, a plurality of the individual cells 110 can be provided along the stacking direction Z as well.

According to such a configuration, a plurality of the individual cells 110 can be sufficiently pressed by the case 121 via the individual cells 110 disposed on the outermost side, while sufficiently maintaining the stiffness of the case 121.

Second Embodiment

For example, a battery module 200 according to the second embodiment is different from the above-described battery module 100 according to the first embodiment, in the configuration in which a reinforcing member 222 and a case 221 are fitted to each other by concavo-convex fitting portions.

In the second embodiment, the same reference characters are used for configurations that are the same as the first embodiment described above, and the descriptions thereof are omitted.

The configurations of the battery modules 200 and 300 will be described with reference to FIG. 4.

Figures 4A, 4B:
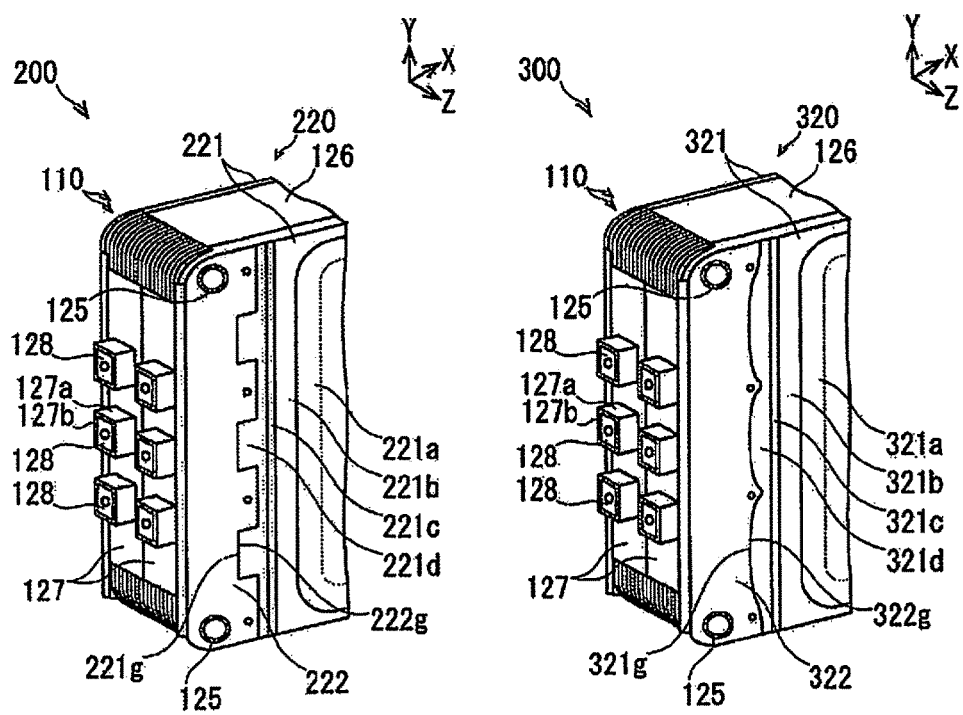
FIG. 4A is a perspective view illustrating the principle parts of the battery module of in accordance with a second embodiment.
FIG. 4B is a perspective view illustrating the principle parts of the battery module in accordance with the second embodiment.

FIG. 4A is a perspective view illustrating the principle parts of the battery module 200. FIG. 4B is a perspective view illustrating the principle parts of the battery module 300.

The battery module 200 is shown in FIG. 4A. In the battery module 200, the reinforcing member 222 of the housing 220 is provided with a fitting portion 222g at the end portion that faces the second extension portion 221d. The fitting portion 222g is formed by combining rectangular concave and convex shapes along the Y direction. The case 221 is provided with a second extension portion 221d at the end portion that faces the fitting portion 222g of the reinforcing member 222. The second extension portion 221d is formed by combining rectangular convex and concave shapes that fit with the fitting portion 222g.

The battery module 300 is shown in FIG. 4B. In the battery module 300, the reinforcing member 322 of the housing 320 is provided with a fitting portion 322g at the end portion that faces the second extension portion 321d. The fitting portion 322g is formed by combining wavy concave and convex shapes along the Y direction. The case 321 is provided with a second extension portion 321d at the end portion that faces the fitting portion 322g of the reinforcing member 322. The second extension portion 321d is formed by combining wavy convex and concave shapes that fit with the fitting portion 322g.

According to the battery modules 200 and 300 of the second embodiment described above, in addition to the action and effects of the battery module 100 according to the first embodiment, further action and effects are achieved by the following configurations.

For example, in the battery module 200, the reinforcing member 222 is provided with one fitting portion 222g formed by combining a concave and a convex shape, at the end portion that faces the second extension portion 221d. On the other hand, the second extension portion 221d is provided with another fitting portion 221g formed by combining a convex shape and a concave shape that fits the one fitting portion 222g.

According to such a configuration, for example, in the battery module 200, since the fitting portion 222g of the reinforcing member 222 and the fitting portion 221g of the case 221 are fitted in a concavo-convex shape, the case 221 can be regulated from moving in the Y direction, which intersects with the stacking direction Z, to prevent a misalignment of the case 221.

Besides the above, various modifications to the present invention based on the configurations described in the Claims are possible, which also belong in the scope of the present invention.

For example, in the first embodiment and the second embodiment, the individual cell 110 is described as having a lithium ion secondary battery configuration, but no limitation is imposed thereby. The individual cell 110 can be configured as, for example, a polymer lithium battery, a nickel-hydrogen battery, or a nickel-cadmium battery.

Additionally, in the first embodiment and the second embodiment, the individual cell 110 is described as having a lithium ion secondary battery configuration, but no limitation is imposed thereby. The individual cell 110 can be configured as a primary battery that is used only once.

In addition, in the first and the second embodiments, for example, the reinforcing member 122 is described as being configured to be disposed outward of the case 121 along the stacking direction Z, but no limitation is imposed thereby. The reinforcing member 122 can be configured to be disposed inward of the case 121 along the stacking direction Z to be sandwiched by the case 121 and the individual cells 110. Furthermore, in the case of such a configuration, the reinforcing member can be configured to be provided with a projection in a direction away from the individual cells 110 along the stacking direction, and the second extension portion of the case can be configured to be provided with a fitting hole or a fitting pit for fitting the projection along the stacking direction.

The invention claimed is:

1. A battery module comprising:
   an individual cell configured with a power generating element having a positive electrode and a negative electrode stacked with a separator therebetween and sealed by a cladding material; and
   a housing including a pair of cases that sandwich the individual cell from two sides in a stacking direction and a reinforcing member having a plate shape that is joined to and reinforces one of the cases,
   at least one of the cases comprising:
   a bulging portion curving and protruding toward the individual cell, and pressing the individual cell,
   a first extension portion extending from an outer periphery of the bulging portion in a transverse direction with respect to the stacking direction,
   an inclined portion extending from an outer periphery of the first extension portion while sloping toward the individual cell, and
   a second extension portion extending from an outer periphery of the inclined portion along a transverse direction with respect to the stacking direction, the second extension portion being joined to the reinforcing member.

2. The battery module according to claim 1, wherein a thickness of the reinforcing member along the stacking direction is thinner than a thickness in the stacking direction of the inclined portion.

3. The battery module according to claim 1, wherein at least a portion of the reinforcing member is adjacent to the second extension portion along the stacking direction.

4. The battery module according to claim 3, further comprising
   a cylindrical holding member disposed between the cases, and
   a fixing member having a cylindrical portion that extend in the stacking direction and a protruding portion that protrudes from a first end of the with respect to in a transverse direction with respect to the stacking direction, the cylindrical portion extending through a first through-hole in the second extension portion and a second through-hole in the reinforcing member to anchor the holding member and fix the reinforcing member to the one of the cases.

5. The battery module according to claim 1, wherein the reinforcing member includes a flange along the stacking direction, the flange being spaced from the second extension portion in a transverse direction with respect to the stacking direction.

6. The battery module according to claim 1, wherein the reinforcing member includes an end portion with a first fitting portion having a concave and a convex shape that faces the second extension portion, and
   the second extension portion includes a second fitting portion having a convex shape and a concave shape that fits the first fitting portion.

7. The battery module according to claim 3, wherein the reinforcing member includes a projection that projects in a direction toward the individual cell along the stacking direction, and
   the second extension portion includes a fitting part that receives the projection along the stacking direction.

8. The battery module according to claim 1, wherein the individual cell further comprise an insulating member that is layered at an end of one of the positive and negative electrodes to prevent electrically short-circuiting, and
   a thickness of the inclined portion in the stacking direction is larger than a thickness of the insulating member.

9. The battery module according to claim 1, wherein several of the individual cells are provided along the stacking direction.

10. The battery module according to claim 2, wherein at least a portion of the reinforcing member is adjacent to the second extension portion along the stacking direction.

11. The battery module according to claim 10, wherein a cylindrical holding member disposed between the cases, and
    a fixing member having a cylindrical portion that extend in the stacking direction and a protruding portion that protrudes from a first end of the with respect to in a transverse direction with respect to the stacking direction, the cylindrical portion extending through a first through-hole in the second extension portion and a second through-hole in the reinforcing member to anchor the holding member and fix the reinforcing member to the one of the cases.

12. The battery module according to claim 2, wherein the reinforcing member includes a flange along the stacking direction, the flange being spaced from the second extension portion in a transverse direction with respect to the stacking direction.

13. The battery module according to claim 2, wherein the reinforcing member includes an end portion with a first fitting portion having a concave and a convex shape that faces the second extension portion, and
    the second extension portion includes a second fitting portion having a convex shape and a concave shape that fits the first fitting portion.

14. The battery module according to claim 10, wherein the reinforcing member includes a projection that projects in a direction toward the individual cell along the stacking direction, and
    the second extension portion includes a fitting part that receives the projection along the stacking direction.

15. The battery module according to claim 2, wherein the individual cell further comprise an insulating member that is layered at an end of one of the positive and negative electrodes to prevent electrically short-circuiting, and a thickness of the inclined portion in the stacking direction is larger than a thickness of the insulating member.

16. The battery module according to claim 2, wherein several of the individual cells are provided along the stacking direction.

17. The battery module according to claim 3, wherein the reinforcing member includes a flange along the stacking direction, the flange being spaced from the second extension portion in a transverse direction with respect to the stacking direction.

18. The battery module according to claim 3, wherein the reinforcing member includes an end portion with a first fitting portion having a concave and a convex shape that faces the second extension portion, and
the second extension portion includes a second fitting portion having a convex shape and a concave shape that fits the first fitting portion.

19. The battery module according to claim 4, wherein the reinforcing member includes a projection that projects in a direction toward the individual cell along the stacking direction, and
the second extension portion includes a fitting part that receives the projection along the stacking direction.

20. The battery module according to claim 3, wherein the individual cell further comprise an insulating member that is layered at an end of one of the positive and negative electrodes to prevent electrically short-circuiting, and
a thickness of the inclined portion in the stacking direction is larger than a thickness of the insulating member.

* * * * *